United States Patent [19]

Brown de Colstoun et al.

[11] Patent Number: 5,049,756
[45] Date of Patent: Sep. 17, 1991

[54] METHOD AND SYSTEM FOR DETECTING FOREST FIRES

[76] Inventors: Francois Brown de Colstoun, 5755 E. River Rd. #2909, Tucson, Ariz. 85723-6723; Jean-Paul Chambaret, 161 Av. Paul Vaillant Couturier, 94250 Gentilly, France; Yves Chambaret, 77 Avenue Parmentier, 75011 Paris, France; Arnaud le Saige de la Villesbrunne, 108 Bld de la Reine, 78000 Versailles, France; Jean-Claude Moscovici, 66 Av. Victor Hugo, 75116 Paris, France

[21] Appl. No.: 421,122

[22] Filed: Oct. 13, 1989

[30] Foreign Application Priority Data

Oct. 13, 1988 [FR] France ............... 88 13498

[51] Int. Cl.$^5$ .............................................. H01L 31/14
[52] U.S. Cl. .................................... 254/554; 250/342
[58] Field of Search ............... 250/554, 574, 342; 169/61; 340/578

[56] References Cited

U.S. PATENT DOCUMENTS

| | | |
|---|---|---|
| 4,146,927 | 3/1979 | Erickson et al. .................. 364/560 |
| 4,567,367 | 1/1986 | Brown de Colstoun et al. ... 250/340 |
| 4,755,687 | 7/1988 | Akiba et al. ....................... 250/554 |
| 4,800,285 | 1/1989 | Akiba et al. ....................... 250/554 |
| 4,893,026 | 1/1990 | Brown de Colstoun et al. ... 250/574 |

FOREIGN PATENT DOCUMENTS

| | | |
|---|---|---|
| 8667081 | 1/1986 | Australia . |
| 0117162 | 8/1984 | European Pat. Off. . |
| 0234164 | 9/1987 | European Pat. Off. . |
| 2021893 | 12/1979 | United Kingdom . |
| 2191573 | 12/1987 | United Kingdom . |

OTHER PUBLICATIONS

Electronics and Communications in Japan, vol. 64-C, No. 7, (1981), pp. 117-126, "Automatic Laser Radar Systems for Measurement of Atmospheric Pollutants".

Primary Examiner—David C. Nelms
Attorney, Agent, or Firm—Kenyon & Kenyon

[57] ABSTRACT

A method of detecting a heat source in an area to be watched consists of disposing a detector on a support elevated with respect to the area to effect a sweeping motion at least in a horizontal plane. Points in the area to be watched are defined by the angular position of the detector in the horizontal and vertical planes when the detector is directed toward a point and by at least one associated additional data element that impounds the geographic position of the point in a predetermined reference system.

8 Claims, 2 Drawing Sheets

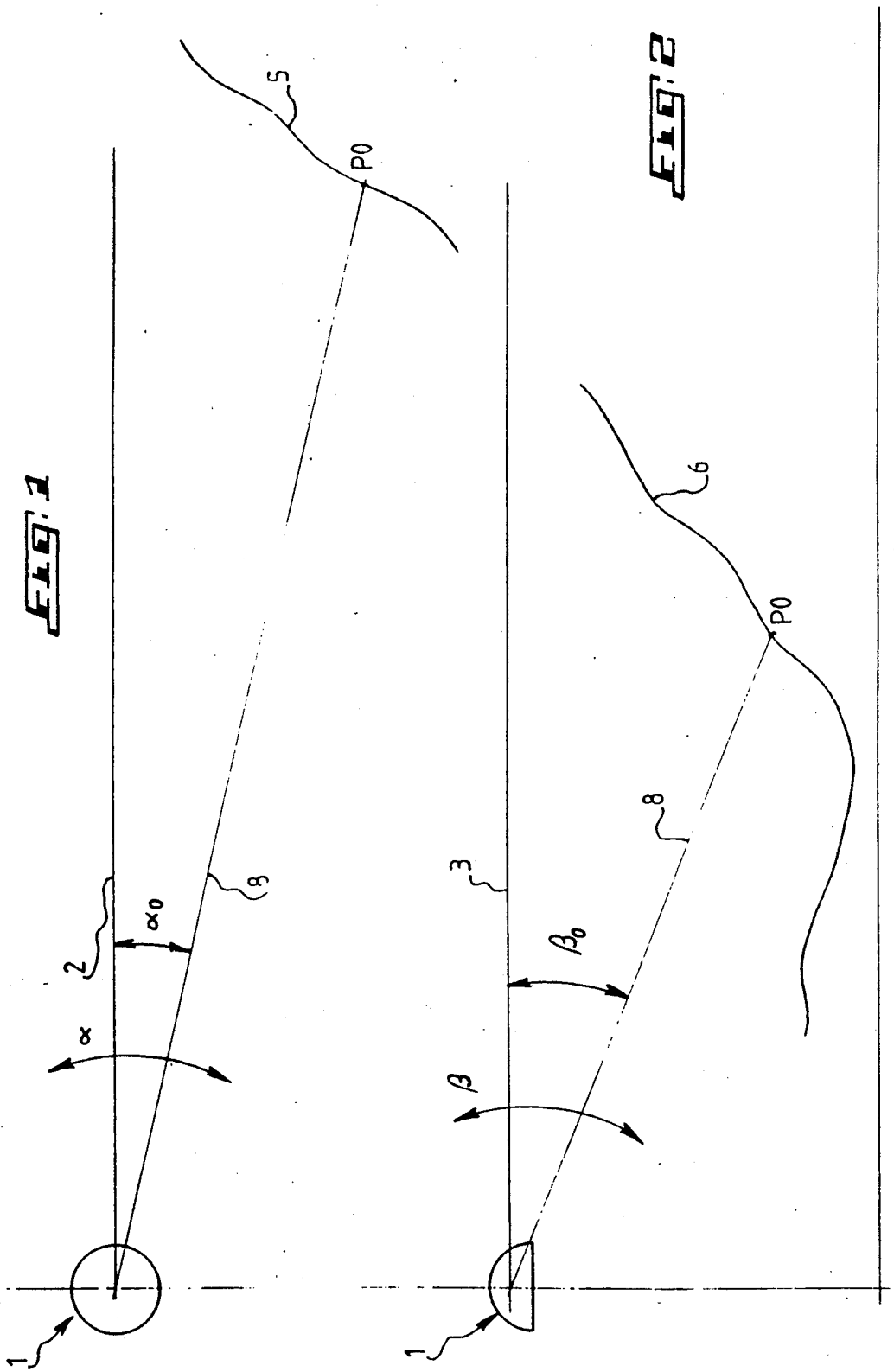

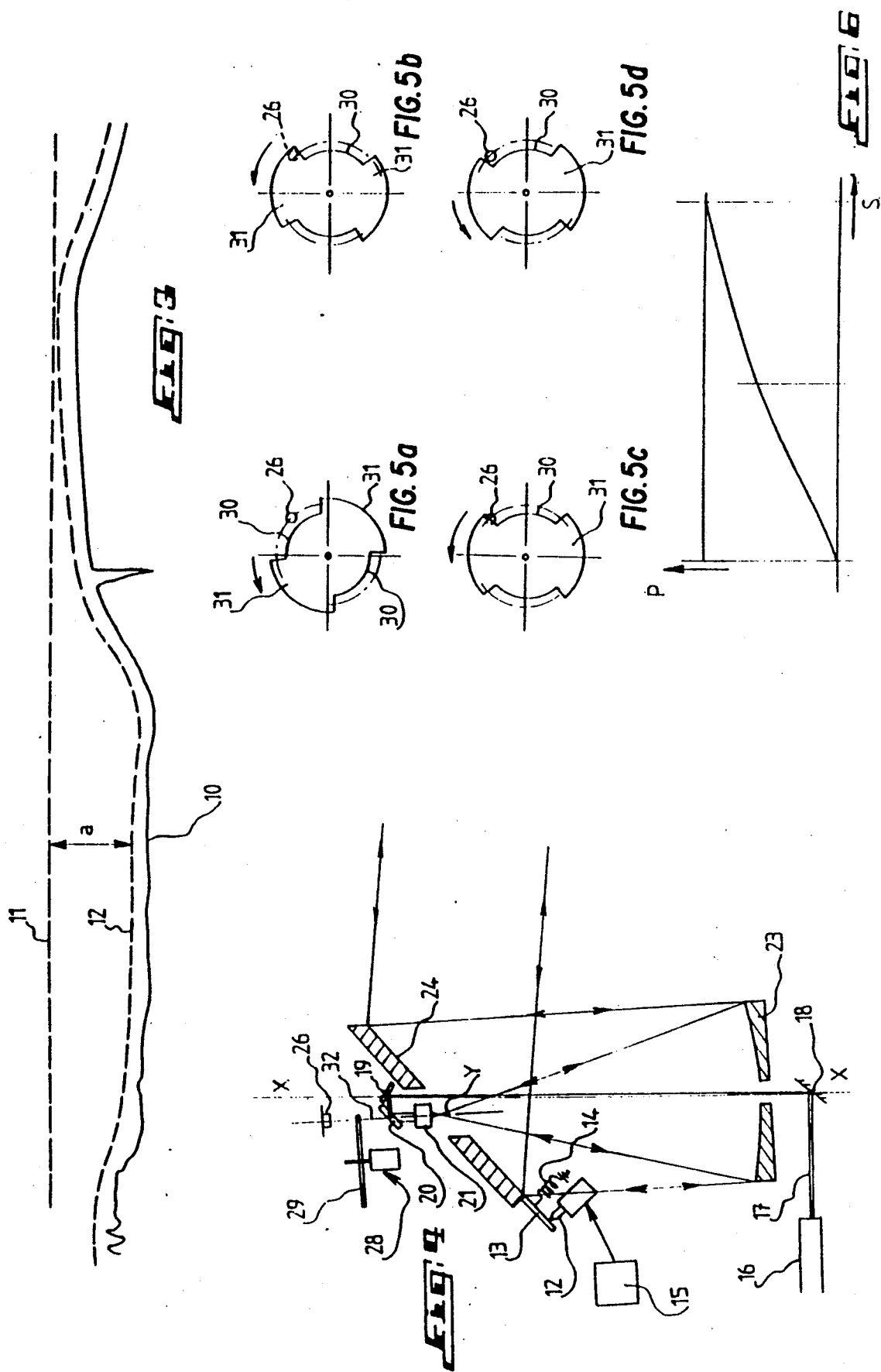

METHOD AND SYSTEM FOR DETECTING FOREST FIRES

BACKGROUND OF THE INVENTION

The invention relates to a method of detecting a heat source such as a forest fire in an area to be watched and a system for carrying out this method.

It is known in the art to use for this purpose a detector installed on a tower to carry out a watch through a horizontal and, if necessary, vertical sweeping movement. When using a passive detector that senses the heat source through the infrared radiation emitted by the source, at least two detecting stations geographically remote from each other are required to locate the heat source. This drawback is eliminated when using active detecting stations, for instance of the type that emits a laser beam, locating a heat source by analyzing the portion of the emitted radiation back-scattered by the smoke column produced by the fire to be detected. However, this detecting process suffers from the major drawback that the sweeping movement takes place in a single plane, for example a horizontal plane, that causes those fires that break out in hollows to be difficult to detect or to be detected too late because the smoke column would be dissipated, for example by the wind, before rising up to the sweeping plane.

SUMMARY OF THE INVENTION

The method and system of the invention overcome these drawbacks while using a single detector. To achieve this result, the method consists of defining points in the area to be watched by their angular position in the horizontal and vertical planes of the detector when the detector is pointed towards each point and in associating with these angular data at least one additional data element impounding the geographic position of the point in a predetermined reference system.

When a passive detector is sued, such as one that detects the infrared radiation emitted by the heat source, the additional data element is a geographic data element such as a contour line or a profile line on which the point lies or a data element indicating the position of the point on a geographic map.

When using an active detector that carries out a sweeping motion in a predetermined plane, the data element is the vertical offset of the point in the area under watch from the sweep plane and the angular position in the vertical plane of the detector is changed as a function of the offset so that the sweeping motion follows the horizon line of the area to be watched.

The system for carrying out the method of the invention for a passive detector performing a step-by-step sweeping motion comprises a computer device that has a memory storing, for each point in the area to be watched, the associated angular position of the detector and the additional geographic data element and that is programmed to indicate the geographic data element for a point corresponding to an angular position of the detecting device.

The system for carrying out the method for an active detector performing a step-by-step sweeping motion comprises a computer device having a memory storing for each angular position in the horizontal plane of the detector a vertical angular value representing the offset of a point in the area to be watched from the reference sweeping plane and a device for controlling the rotation of the detector about a horizontal axis to orient the detector towards the point.

Further objects, characterizing features, details, and advantages of the invention will be apparent from the following detailed description and accompanying drawings illustrating two embodiments of the invention.

BRIEF DESCRIPTION OF THE DRAWINGS

FIGS. 1 and 2 schematically illustrate in plan and elevation views, respectively, a first embodiment of the method of the invention using a passive detector.

FIG. 3 schematically illustrates a second embodiment of the method of the invention using an active detector.

FIG. 4 schematically illustrates an active detector usable in particular in the second embodiment illustrated in FIG. 3.

FIGS. 5a–5d are detailed views of the detector shown in FIG. 4, illustrating several successive operating phases.

FIG. 6 shows the characteristic curve of the radiation rate received from the back-scattered radiation as a function of the distance of the heat source from the detector shown in FIGS. 4 and 5.

DETAILED DESCRIPTION

The method of the invention illustrated schematically in FIGS. 1 and 2 employs a passive detector 1 that detects a heat source such as a nascent forest fire by the infrared radiation emitted by the source. It may be of any known suitable kind capable of performing a sweeping motion over a predetermined angle in a horizontal plane, for instance of 360°, and in a vertical plane. The horizontal and vertical sweep angles $\alpha$ and $\beta$ are measured from a reference angular position designated by the reference numerals 2 and 3, respectively. One detector that can be used is disclosed in the Applicants' U.S. Pat. No. 4,567,367.

FIGS. 1 and 2 show contour and profile lines 5 and 6, respectively, of the geographic area to be watched for a predetermined angular position in the vertical and horizontal planes, respectively, of the optical axis 8 of the detector 1. Each geographic point $P_0$ lying on the contour and profile lines 5 and 6 can be defined with respect to the detector 1 by a horizontal or azimuth angle $\alpha_0$, a vertical angle $\beta_0$, and at least one geographic coordinate, or data element, in a suitable reference system. The angles $\alpha_0$ and $\beta_0$ are determined by the corresponding angular position of the optical axis 8 of the detector 1. The geographic data element could be determined from a profile or contour line on which the point lies. It could also be determined from the coordinates of a reference system with standard orthogonal coordinate axes. By considering the topography of the geographic area to be watched, it is possible to associate with a pair of measured angular values a third coordinate that has been previously determined from the topography of the area. In other words, for a given angular position of the axis 8 of the detector, the point is defined by the intersection of the axis 8 and the profile or contour line on which the point lies.

By associating with a pair of values of angular positions of the detector the geographic data for the point corresponding to those angular values, a heat source whose infrared radiation has been received by the detector 1 can be located from the angular position of the detector when it receives the infrared radiation. The geographic coordinates of the point corresponding to a given angular position of the detector can be stored in the memory of a computer. The computer can be programmed to indicate the geographic coordinates of a detected heat source based on the angular position. When using the system disclosed in Applicants' U.S. Pat. No. 4,567,367, the computer that is a part of that system could perform this function in addition to the other functions it performed in that system. It will be apparent that by using the method illustrated in FIGS. 1 and 2 a heat source can be located with a single detector. This device should of course be mounted on a supporting structure sufficiently tall with respect to the area to be watched that the geographic coordinates of any point in the area can be determined unambiguously and with sufficient accuracy.

FIG. 3 illustrates an embodiment of the method of the invention employing an active heat source detector. This detector can be of the type that emits a laser beam and detects the radiation back-scattered by the smoke produced by a nascent forest fire. Such a system is disclosed in Applicants' U.S. Pat. No. 4,893,026. Such a can watch an extensive geographic area from a single detector station. Since such a detector analyzes the back-scattered laser beam signals, it can determine the distance of the substance that back-scatters the signals from the detector.

In FIG. 3, line 10 represents the horizon line as seen from the detector station within its angular range. Known detectors carry our a sweeping motion in a fixed, for instance horizontal, plane 11.

According to the invention, the detector 1 sweeps the horizon along the line 12 extending substantially parallel to the horizon line 10 at a predetermined, fixed distance. This distance is selected so that a fire can be detected practically as soon as the smoke it produces rises above the horizon line. A fire is thus detected with uniform accuracy, safety, and reliability throughout the area to be watched regardless of the unevenness of the terrain in the area.

FIG. 4 schematically illustrates the structure of a station for the detection and location of a fire, adapted for carrying out the method illustrated in FIG. 3. Source 16 emits a relatively small diameter laser beam 17. The emitted beam 17 is reflected by reflecting mirrors 18 and 19 to separating device 20, which can be a separating plate or a separating polarization cube. From separating device 20, the emitted beam 17 travels to optical device 21, which varies the beam's polarization and diverges it. Mirror 23 positioned in the divergent beam collimates the beam, reflecting it as a relatively large diameter beam of parallel rays toward flat reflecting mirror 24. Except for the source 16 and mirror 18, the system revolves about axis X—X, directing the emitted beam to sweep the area to be watched. As is evident from the Figure, the various component elements of the station are arranged into a compact structure.

Back-scattered light travels along the same optical path as the emitted beam between the separating device 20 and the mirror 24, as indicated by the bi-directional arrows. Separating device 20 separates the emitted and back-scattered beams so that the back-scattered beam reaches a detecting device 26. A station of this kind is disclosed in Applicants' U.S. Pat. No. 4,893,026.

For the detector to scan the horizon along line 12 of FIG. 3, mirror 24 is fitted with means for angular movement about a horizontal axis Y perpendicular to the axis of rotation X—X. These means comprise a push member 12 acting upon an arm 13 attached to the periphery of mirror 24 and a return spring 14. The push member can be the rod of a solenoid that receives control signals from a computer 15. Computer 15 generates for each angular position of the detector a signal corresponding to the vertical offset a of the sweep line 12 from the horizontal plane 11. The offset a for each angular position has previously been stored in a memory of the computer. The computer can be of the type used in the station disclosed in the Applicants' U.S. Pat. No. 4,893,026.

A device 28 with a rotary disc 29 is disposed between the separating device 20 and the detector 26. Disc 29 is generally circular and includes in its peripheral portion two notches 30. The notches are disposed diametrically and symmetrically with respect to the disc's center point, and their bottoms are shaped as segments of a circle.

Disc 29 is disposed to either block or pass the portion 32 of the back-scattered beam between the separating device 20 and the detector 26, depending on its angular position. Peripheral portions 31 of the disc 29 block the back-scattered beam from reaching detector 26, as in FIG. 5b, over a certain angular range of the disc, while access to the detector 26 is free over another angular range when one of the notches is aligned with beam 32, as in FIG. 5a.

Disc 29 thus prevents any dazzling effect when the laser is shot and provides a nearly linear correlation between the back-scattered portion P and the distance s of the detecting station from the place, such as a smoke column, that produced the back-scattering. This correlation is illustrated in FIG. 6. Only a small backscattered portion of the emitted beam reaches the detector 26 when the smoke column is relatively near the station. This effect is achieved in the way illustrated in FIGS. 5b to 5d, which show the relative angular positions of the disc 29 and the detector 26 at the time the laser is fired, at a mean distance of 10 km and at a maximum distance of 20 km. At 5b, the detector is blocked; at 5c, it is partially uncovered; and at 5d it is fully exposed. For instance, with a laser firing rate of one firing per 70 ms, a 20 cm diameter disc rotated at a speed of 6,000 rpm would produce the desired effect.

The invention is particularly well suited for use in areas with uneven terrain. It is evident that it is preferred to place the detector at a height determined by the topography of the terrain in the area to be watched and by the maximum range of the detector. The supporting device could be a tower of appropriate height or a flying platform appropriately anchored to the ground.

If the supporting structure is not absolutely stationary and is deflected, for example by the wind or by thermal stresses resulting from non-uniform heating produced by solar radiation, a bi-pendular system can be used to compensate for these undesired deflections. Such a system could comprise two rods for which pivoting motion is damped along two perpendicular axes and which carry at their ends a core co-operating with an inductive pick-up unit with synchronous demodulation. The pick-ups can detect spurious deflections of 20" of arc. Such a system is well known. From the data provided by this bi-pendular system, angular corrections to the mirror 24 can be calculated by the computer 15 in a known manner.

What is claimed is:

1. A method for detecting and locating a heat source such as a forest fire in an area to be watched comprising the steps of:
   a. placing an infrared radiation detector having an optical axis and being capable of detecting a heat source lying substantially on the optical axis on a support structure elevated sufficiently with respect to the area that the optical axis can be directed to substantially any point in the area;
   b. causing the detector to carry out a horizontal and vertical scanning motion to detect a heat source within the area to be watched;
   c. defining for each point in the area to be watched angular data in a reference system comprising the angles formed by the optical axis with respect to a reference line in a horizontal and vertical plane including the optical axis when the optical axis is directed to the point;
   d. associating with the angular data for each point in additional geographical data element impounding the geographical location of the point in a geographic reference system so that the location of each point in the area to be watched is defined by its associated angular data.

2. The method of claim 1 wherein the additional geographic data element is a horizontal contour line on which the point lies.

3. The method of claim 1 wherein the additional geographic data element is a vertical profile line on which the point lies.

4. The method of claim 1 wherein the additional geographic data element is the coordinates of the point in an orthogonal coordinate system.

5. A system for detecting and locating a heat source such as a forest fire, in an area to be watched, comprising:
   a. an infrared radiation detector having an optical axis and being capable of detecting a heat source lying substantially on said optical axis,
   b. a support structure supporting said detector for sweeping rotation about a substantially vertical axis and a substantially horizontal and having a predetermined height above the area to be watched, said height being sufficient for said optical axis to be oriented to any point in said area to be watched;
   c. a computer including a memory storing for each of a plurality of points in the area to be watched a first and second angular datum being the angle of said optical axis when oriented to said point with respect to a reference line in a horizontal plane and in a vertical plane including said optical axis, respectively, and an additional geographic data element defining the location of said point in a geographic reference system, said computer being programmed to automatically supply said additional geographic data element for each point from which said detector receives infrared radiation based on said angular data.

6. The system of claim 5 wherein said additional data element comprises a horizontal contour line on which said point lies.

7. The system of claim 5 wherein said additional data element comprises a vertical profile line on which said point lies.

8. The system of claim 5 wherein said additional data element comprises first and second coordinates of said point in an orthogonal coordinate system.

* * * * *